Figure 1:
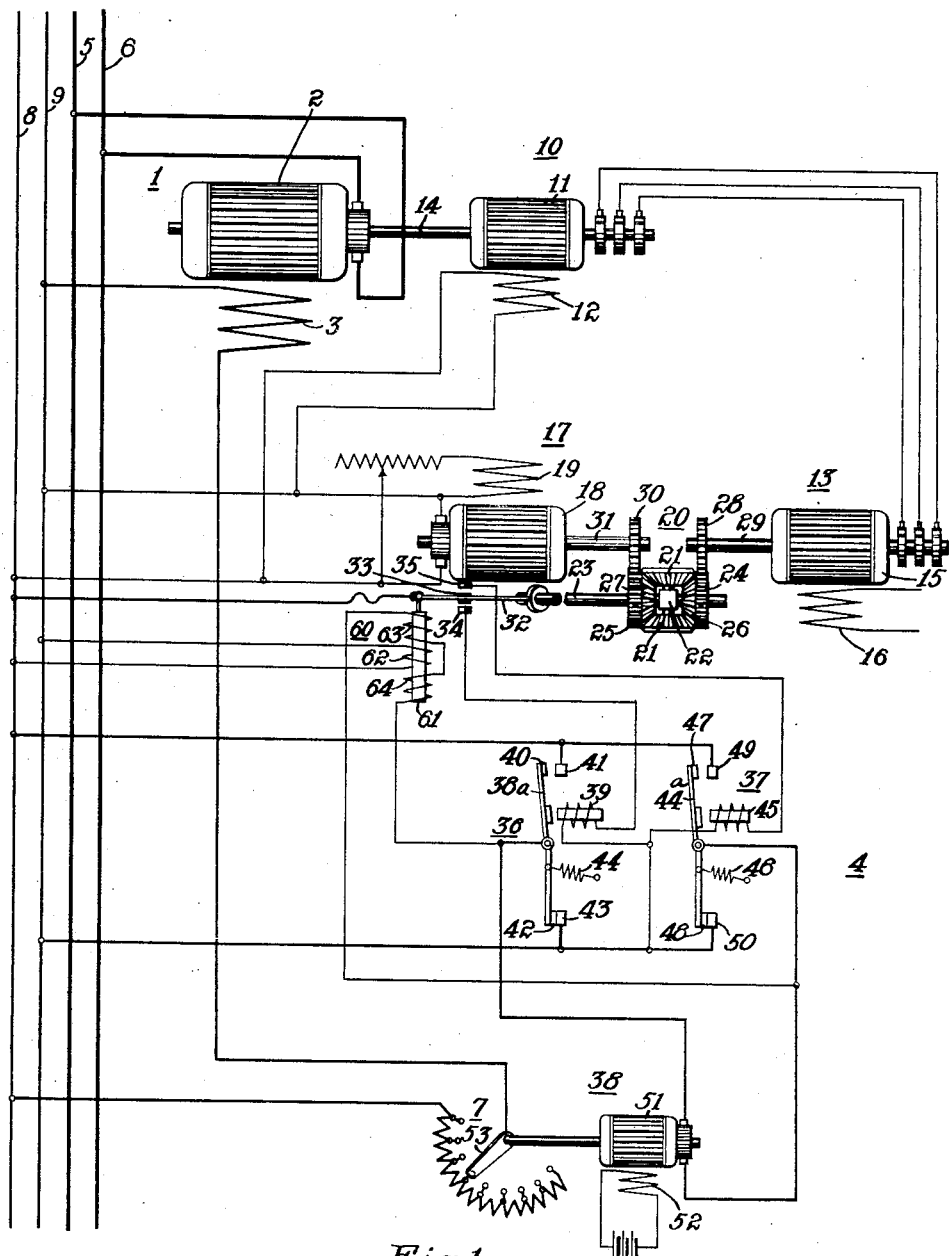

July 15, 1924.

C. A. BODDIE 1,501,263

SPEED REGULATOR SYSTEM

Filed Aug. 6, 1920      2 Sheets-Sheet 1

WITNESSES:
H. T. Shelhamer
W. B. Wells.

INVENTOR
Clarence A. Boddie
BY
Wesley J. Carr
ATTORNEY

July 15, 1924.

C. A. BODDIE 1,501,263

SPEED REGULATOR SYSTEM

Filed Aug. 6, 1920

2 Sheets-Sheet 2

WITNESSES:
H. T. Shelhamer
W. B. Wells.

INVENTOR
Clarence A. Boddie
BY
Wesley G. Carr
ATTORNEY

Patented July 15, 1924.

1,501,263

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed August 6, 1920. Serial No. 401,586.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Speed-Regulator Systems, of which the following is a specification.

My invention relates to regulator systems and, particularly, to regulator systems for maintaining the speed of rotating members substantially constant.

One object of my invention is to provide a regulator system that shall so control the excitation of a propelling motor by a differential gear mechanism and a constant-speed motor as to maintain the speed of such propelling motor substantially constant and that shall preferably be provided with means for preventing hunting action.

In many industries, such, for example, as the steel industries, many operations are performed which require motors to be operated at substantially constant speed, irrespective of the changes in the load carried by them. Thus, in a rolling mill, and particularly in a continuous mill for rolling ingots into billets, it is essential that the various sets of rolls operate at substantially constant speed to prevent buckling or stretching of the steel passing through the rolls.

In a speed-regulator system constructed in accordance with my invention, the excitation of each propelling motor is so controlled as to maintain the speed of the motor substantially constant, irrespective of the changes in load on such motor.

In the preferred embodiment of my invention, a differential gear mechanism, which controls the excitation of the main motor, is jointly operated by a constant-speed motor and a synchronous motor. The synchronous motor is operated by a small alternating-current generator which is operated in accordance with the speed of the main motor, and, preferably, the armature of such generator is mounted on the shaft of the main motor. The differential gear mechanism selectively operates two switches which control the operation of a motor-operated rheostat. The motor-operated rheostat so controls the excitation of the main motor as to maintain the speed of such motor substantially constant. Preferably, an electromagnet is operated in accordance with the operation of the motor-operated rheostat for reacting on the differential gear mechanism to prevent hunting action.

Figure 2:
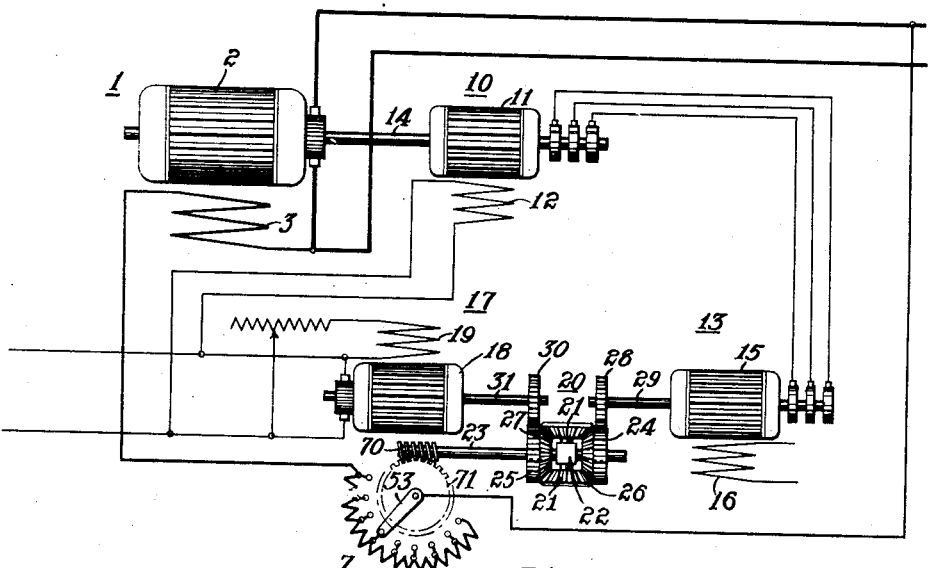
Figure 3:
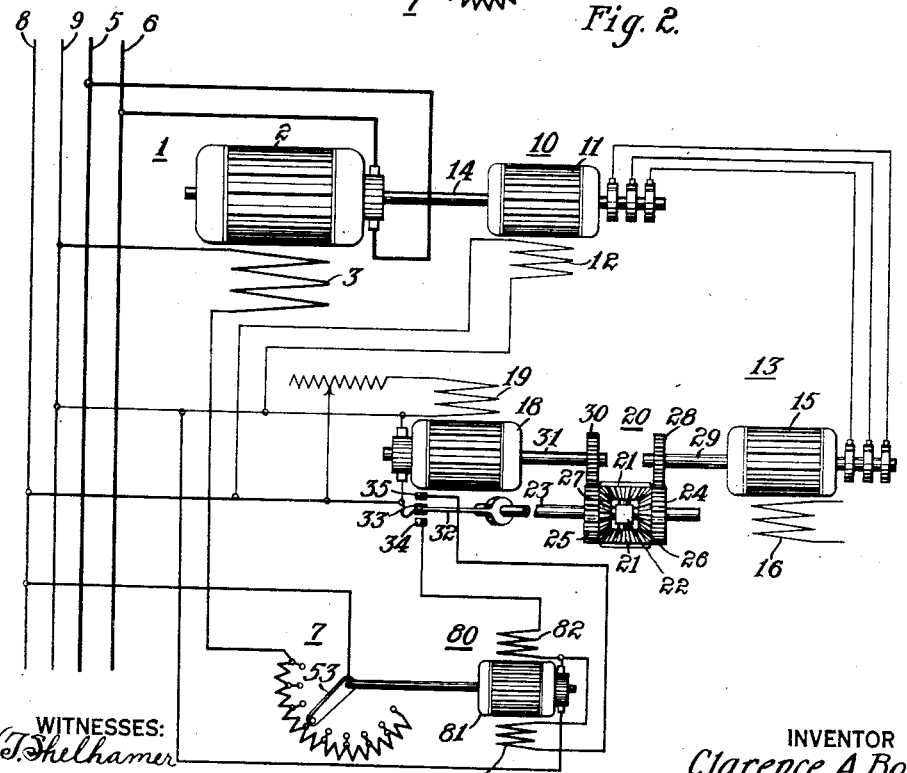

In the accompanying drawings, Figure 1 is a diagrammatic view of a speed-regulator system constructed in accordance with my invention, and Figs. 2 and 3 are diagrammatic views disclosing modifications of my invention.

Referring to the drawings, a main motor 1, comprising an armature 2 and a field-magnet winding 3, is so controlled by a regulator mechanism 4 as to operate at substantially constant speed. The armature 2 of the main motor is connected through any suitable control apparatus (not shown), to supply conductors 5 and 6. The field-magnet winding 3 is connected, through a rheostat 7, to the auxiliary supply conductors 8 and 9.

A small alternating-current generator 10, having an armature 11 and a field-magnet winding 12, is provided for operating a synchronous motor 13. The armature 11 of the generator 10 is preferably mounted upon the shaft 14 of the main motor 1 in order to be operated in accordance with the speed of the main motor, and the field-magnet winding 12 is connected across the auxiliary supply conductors 8 and 9. The synchronous motor 13 comprises an armature 15, which is connected to the generator 10, and a field-magnet winding 16, which is connected to any suitable source of direct current.

A constant-speed motor 17, comprising an armature 18 and a field-magnet winding 19, is provided for co-operating with the synchronous motor 13 to operate a differential gear mechanism 20. The armature and the field-magnet winding of the motor 17 are preferably connected to the auxiliary supply conductors 8 and 9, and, if so desired, any suitable regulating mechanism may be provided for maintaining the speed of such motor substantially constant.

The differential gear mechanism 20 may be of any well-known type and has been illustrated in the drawing as comprising a central portion having two bevel gears 21 mounted upon a block 22. The block 22 is fixedly connected to a shaft 23. The shaft 23 rotatably supports the end portion of the differential gear mechanism comprising gear wheels 24 and 25 and bevel gear wheels 26 and 27. The gear wheels 24 and 26 are preferably an integral structure and the gear wheel 24 meshes with a gear wheel 28 which is mounted upon the shaft 29 of the synchronous motor 13. The gear wheels 25 and 27 are fixedly connected together and, preferably, embody an integral structure. The gear wheel 25 meshes with a gear wheel 30, which is mounted upon the shaft 31 of the constant-speed motor 17.

The differential gear mechanism is jointly operated by the constant-speed motor 17 and the synchronous motor 13, and any change in speed of the synchronous motor relative to the constant-speed motor effects operation of the differential gear mechanism for a purpose to be hereinafter set forth.

A contact arm 32 is fixedly mounted upon the shaft 23 in order to be operated in accordance with the operation of the central portion of the differential gear mechanism. The contact arm 32 which may be constructed of spring metal carries a contact member 33 which engages stationary contact members 34 and 35 according to the operation of the differential gear mechanism. The contact members 33, 34 and 35 control the operation of two switches 36 and 37, which, in turn, control the operation of a motor 38.

The switch 36 comprises a pivotally mounted contact arm 38a and an electromagnet 39 for controlling the position of such arm. The contact arm carries a contact member 40, which engages a stationary contact member 41 when the switch is in an operative position, and a second contact member 42 which engages a stationary contact member 43 when the switch is in a released position. A spring member 44 is provided for biasing the contact arm 38a to the released position. The coil of the electromagnet 39 is connected across the auxiliary supply conductors 8 and 9 upon engagement between the contact members 33 and 34.

The switch 37 comprises a pivotally mounted contact arm 44a which is operated by an electromagnet 45 and is biased to a released position by a spring member 46. The contact arm 44a carries two contact members 47 and 48 which respectively engage stationary contact members 49 and 50, according to the position of the contact arm. The coil of the electromagnet 45 is connected across the auxiliary supply conductors 8 and 9, upon engagement between the contact members 33 and 35. The stationary contact members 41 and 49 of the two switches are directly connected to the supply conductor 8, and the two stationary contact members 43 and 50 are directly connected to the supply conductor 9. The two contact arms 38a and 44 are connected to the armature 51 of the auxiliary motor 38.

The auxiliary motor 38, which controls the operation of the rheostat 7, is provided with a field-magnet winding 52 which is energized from any suitable source. The motor 38 may be connected to the contact arm 53 in any suitable manner for controlling the resistance included in the main field-magnet winding 3 in accordance with the operation of the differential gear mechanism 20.

An auxiliary electromagnet 60, which is energized in accordance with the operation of the switches 36 and 37, is provided for reacting on the differential gear mechanism in such manner as to prevent hunting action. The electromagnet 60 comprises a core armature 61, which is pivotally connected to the arm 32 of the differential gear mechanism, a coil 62, which is connected to the auxiliary supply conductors 8 and 9, and two coils 63 and 64, which are disposed adjacent to the coil 62. The two coils 63 and 64 are connected in series to the two contact arms 38a and 44a.

The construction and operation of the electromagnet 60 is completely described in my copending application, Serial No. 378,731, filed May 4, 1920, (Case No. 7125). The electromagnet 60 is basically excited or polarized by the coil 62, and the core armature 61 is moved in a direction determined according to the direction of the current flow through the two coils 63 and 64.

The differentially wound coils 63 and 64, in circuit with each other, are energized in accordance with the operation of the switches 36 and 37, so that they receive current at the same time that the motor 38 is energized, and in a direction corresponding to the direction of current flow through the motor. Consequently, one of the differential coils will create a flux opposing the flux of the polarizing coil 62, while the other differential coil will create a flux in the same direction as the flux created by the coil 62. The result of the energization of the differential coils will, therefore, be to shift the position of maximum flux density from the center of the coil 62 in one direction or the other direction, depending upon which coil opposes and which coil aids the polarizing coil 62. That is to say, the direction toward which the maximum flux density will be shifted will depend upon the direction of current flow through the differential coils.

If the switch 37 is operated, current flows through the coils 63 and 64 in such direction as to operate the core armature 61 to separate the contact members 33 and 35. If the switch 36 is operated, the core armature 61 is raised to separate the contact members 33 and 34. The electromagnet 60 is not of sufficient strength to separate the contact members 33 and 35 or the contact members 33 and 34 until just prior to the obtaining of normal-speed condition by the main motor 1.

If the speed of the main motor 1 is raised above normal value, the frequency of the current generated by the generator 10 is raised to increase the speed of the synchronous motor 13. Such increase in the speed of the synchronous motor 13 operates the central portion of the differential gear mechanism 20 to effect engagement between the contact members 33 and 35. Thereupon, a circuit is completed from the auxiliary supply conductors 8 and 9 for energizing the electromagnet 45 of the switch 37. The switch 37 is operated and a circuit is completed from the supply conductor 8 through the contact members 47 and 49, contact arm 44a, armature 51 of the motor 38, contact arm 38a, and the contact members 42 and 43 to the supply conductor 9. The auxiliary motor 38 is operated in a clockwise direction to decrease the resistance value of the rheostat 7 which is included in circuit with the field-magnet winding 3 of the main motor. Accordingly, the speed of the main motor is reduced.

If no means were provided for preventing hunting action, the main motor 1 would continue to decrease in speed until the differential gear mechanism 20 was operated to separate the contact members 33 and 35. Upon separation of the contact members 33 and 35, the switch 37 would be released to prevent further operation of the auxiliary motor 38 to change the excitation of the main motor. Such operation is inadvisable, inasmuch as the various moving parts of the regulator will overtravel to decrease the speed of the motor 1 below normal value.

In order to prevent such overtravel and the consequent hunting action, the electromagnet 60 is provided for so changing the setting of the regulator as to stop the operation of the motor 38 just prior to the obtaining of normal-speed condition by the main motor 1. In the operation above described, the electromagnet 60 is so energized as to exert a force tending to separate the contact members 33 and 35. Consequently, such contact members are separated just prior to the obtaining of normal speed by the motor 1 and hunting action on the part of the regulator is prevented.

If the main motor 1 is operating below normal speed, the generator 10 develops a current having a frequency which causes the speed of the synchronous motor 13 to decrease. Such decrease in the speed of the synchronous motor 13 causes the differential gear mechanism 20 to effect engagement between the contact members 33 and 34.

Upon engagement between the contact members 33 and 34, a circuit is completed from the supply conductors 8 and 9 through the coil of the electromagnet 39 for operating the switch 36. Thereupon, a circuit is completed which extends from the supply conductor 8 through the contact members 40 and 41, contact arm 38a, armature 51 of the auxiliary motor 38, contact arm 44a and the contact members 48 and 50 to the supply conductor 9. Thereupon, the auxiliary motor 38 is operated in a counter-clockwise direction for increasing the resistance included in the circuit of the main field-magnet winding 3 to increase the speed of the motor 1.

Upon operation of the switch 36, the electromagnet 60 is so energized as to produce a force tending to effect separation of the contact members 33 and 34. Consequently, the setting of the regulator is changed, and separation of the contact members 33 and 34 is effected just prior to the obtaining of normal speed by the motor 1.

In the systems shown in Figs. 2 and 3 of the drawing, no means is provided for preventing hunting action. Inasmuch as the two systems shown in Figs. 2 and 3 are similar to the system shown in Fig. 1, like parts will be indicated by corresponding reference numerals.

In the system shown in Fig. 2 of the drawing, a worm 70 is directly mounted upon the shaft 23 of the differential gear mechanism 20. Such worm meshes with a worm wheel 71 which is directly connected to the contact arm 51 of the rheostat 7.

The system disclosed in Fig. 2 operates in the same manner as the system disclosed in Fig. 1, with the exception that the differential gear mechanism controls the excitation of the field-magnet winding 3 directly by means of the rheostat 7.

In the system shown in Fig. 3 of the drawing, the contact members 33, 34 and 35 directly control the operation of a motor 80 for controlling the operation of the rheostat 7. The motor 80 comprises an armature 81 and two field-magnet windings 82 and 83. The field-magnet windings 82 and 83 are respectively connected to the stationary contact members 34 and 35 and are oppositely wound in order to effect operation of the motor, either in a clockwise or in a counter-clockwise direction.

When the contact member 33 is moved into engagement with the contact member 35, by reason of the main motor 1 operating above normal speed, a circuit is completed from the supply conductor 8 through the contact members 33 and 35, field-magnet winding 83, and the armature 81, to the supply conductor 9. Thereupon, the motor 80 is operated in a clockwise direction for decreasing the resistance value of the rheostat 7 which is included in circuit with the field-magnet winding 3. Thereupon, the speed of the main motor 1 is reduced.

If the main motor 1 is operating below normal speed, the contact member 33 is moved into engagement with the contact member 34 by means of the differential gear mechanism 20. Thereupon, a circuit is completed which extends from the supply conductor 8, through the contact members 33 and 34 and field-magnet winding 82 and the armature 81, to the supply conductor 9. The motor 80 is operated in a counter-clockwise direction to increase the resistance value of the resistor 7 which is included in the circuit of the field-magnet winding 3. Thereupon, the speed of the main motor 1 is increased.

Modifications in the system and in the arrangement and location of parts may be made within the spirit and scope of my invention, and such modifications are intended to be covered by the appended claims.

I claim as my invention:—

1. In a speed-regulator system, the combination with a motor, and a differential mechanism having one portion thereof operated in accordance with the speed of said motor, of electroresponsive means controlled by said mechanism for maintaining the speed of said motor substantially constant, and for preventing hunting action.

2. In a speed-regulator system, the combination with a motor, and a mechanical differential mechanism controlled by said motor, of means comprising a motor-operated rheostat controlled by said mechanism for governing the excitation of said motor and means for preventing hunting action, said last named means cooperating to modify the duration of control of said mechanism.

3. In a speed-regulator system, the combination with a main motor and a constant-speed motor, of means comprising a differential gear mechanism jointly operated in accordance with the speed of the main and constant-speed motors for controlling the excitation of the main motor and means for preventing hunting action, said last named means operating to modify the controlling effect of said differential gear mechanism.

4. In a speed-regulator system, the combination with a motor, and a differential mechanism, of means for operating one end portion of said mechanism at a constant speed and for operating the other end portion in accordance with the speed of said motor, means controlled by said mechanism for governing the excitation of said motor and means for preventing hunting action, said last named means operating to oppose and limit the controlling effect of said differential mechanism.

5. In a speed-regulator system, the combination with a main motor, a constant-speed motor, and a differential gear mechanism jointly controlled by said motors, of means comprising a motor-operated rheostat governed by said mechanism for controlling the excitation of the main motor, and means for reacting on said mechanism in accordance with the operation of said motor-operated rheostat to prevent hunting action.

6. In a speed-regulator system, the combination with a main motor, a constant-speed motor, and a differential gear mechanism jointly controlled by said motors, of a motor-operated rheostat controlled by said mechanism for governing the excitation of the main motor, and an electromagnet operated in accordance with the operation of said rheostat for opposing the action of said mechanism to prevent hunting action.

7. In a speed-regulator system, the combination with a main motor, a generator operated in accordance with the speed of the main motor, a constant-speed motor, and a control motor operated by said generator, of means jointly controlled by said constant-speed motor and the control motor for maintaining the speed of the main motor substantially constant, and electroresponsive means operative to oppose the action of said last named means to prevent hunting action.

8. In a speed-regulator system, the combination with a main motor, an alternating-current generator operated in accordance with the speed of the main motor, a constant-speed motor and the synchronous motor operated by said generator, of a differential gear mechanism jointly operated by the constant-speed motor and the synchronous motor, a motor-operated rheostat controlled by said mechanism for governing the excitation of the main motor, and means operated in accordance with the operation of the motor-operated rheostat for opposing the action of the differential mechanism.

9. In a speed-regulator system, the combination with a main motor, a generator operated in accordance with the speed of the main motor, and a constant-speed motor, of a differential mechanism jointly controlled by said generator and said constant-speed motor, and means governed by said mechanism for controlling the excitation of the main motor, said means including an electromagnet energized to oppose said mechanism to prevent hunting action.

10. In a speed-regulator system, the combination with a main motor, an alternating-current generator having an armature mounted on the shaft of the main motor, a synchronous motor operated by said generator, and a constant-speed motor, of a differential gear mechanism, jointly operated by the synchronous motor and the constant-speed motor, and means controlled by said mechanism for governing the excitation of the main motor and for reacting on said mechanism to prevent hunting action.

In testimony whereof, I have hereunto subscribed my name this 28th day of July, 1920.

CLARENCE A. BODDIE.